(12) United States Patent
Zimmerman (10) Patent No.: US 7,966,097 B2
(45) Date of Patent: Jun. 21, 2011

(54) METHOD FOR REGENERATION OF A WATER SOFTENER

(75) Inventor: Jeffrey A. Zimmerman, Forest Lake, MN (US)

(73) Assignee: Ecowater Systems LLC, Woodbury, MN (US)

( * ) Notice: Subject to any disclaimer, the term of this patent is extended or adjusted under 35 U.S.C. 154(b) by 1298 days.

(21) Appl. No.: 11/363,909

(22) Filed: Feb. 28, 2006

(65) Prior Publication Data

US 2007/0199900 A1    Aug. 30, 2007

(51) Int. Cl.
    *B01D 15/04*     (2006.01)
(52) U.S. Cl. ........ 700/271; 700/265; 700/266; 422/105; 422/116; 436/55; 436/40; 436/43; 210/96.1; 210/670
(58) Field of Classification Search .................. 422/101, 422/105, 116; 210/190, 670, 687, 89, 96.1; 340/612; 700/266, 240, 265, 271, 273; 436/43, 436/50, 55
See application file for complete search history.

(56) References Cited

U.S. PATENT DOCUMENTS

| | | |
|---|---|---|
| 3,246,759 A | 4/1966 | Matalon |
| 3,687,289 A | 8/1972 | Tischler |
| 4,257,887 A | 3/1981 | Rak |
| 4,385,357 A | 5/1983 | Davis |
| 4,426,294 A | 1/1984 | Seal |
| 4,469,602 A | 9/1984 | Seal |
| 4,470,911 A | 9/1984 | Reinke |
| 4,568,465 A | 2/1986 | Davis |
| 4,668,402 A | 5/1987 | Norton |
| 4,722,797 A | 2/1988 | Gauer |
| 5,022,994 A * | 6/1991 | Avery et al. .................... 210/670 |
| 5,060,167 A | 10/1991 | Ticcioni |
| 5,089,140 A | 2/1992 | Brane |
| 5,273,070 A * | 12/1993 | Chili et al. ............... 137/599.15 |
| 5,544,072 A * | 8/1996 | Zimmerman et al. ......... 700/265 |
| 6,790,362 B2 * | 9/2004 | FitzGerald et al. ........... 210/662 |

* cited by examiner

*Primary Examiner* — Jill Warden
*Assistant Examiner* — Cedric Chan
(74) *Attorney, Agent, or Firm* — IpHorgan Ltd.

(57) ABSTRACT

A demand initiated method for regenerating a water softener which operates the softener ion exchange bed over a capacity range in which the resin is most efficiently restored by exposure to brine. The reserve capacity of the softener is adjusted in response to the amount of softening capacity used since the last regeneration, as is the quantity of saturated brine to be used for the next regeneration, which is scheduled when the reserve capacity is exceeded, or the remaining available capacity will not be adequate for expected usage on the next day of the week. The method schedules a regeneration when the amount of exchange capacity of the resin bed used since the last regeneration plus the variation of exchange capacity used on the next day plus the average exchange capacity of the resin bed used on the next day is greater than the selected design exchange capacity.

27 Claims, 8 Drawing Sheets

METHOD FOR REGENERATION OF A WATER SOFTENER

FIELD OF THE INVENTION

The present invention relates to a novel method and apparatus for regenerating the water softening or conditioning material in an automatic water softener system.

BACKGROUND OF THE INVENTION

Water softening with ion exchange material, such as resin particles or the like, is well known in the art. During the softening process, typically called the service cycle, the ion exchange resin particles acquire hardness inducing ions from raw water which is being treated in exchange for soft ions (i.e., ions which do not induce hardness to water). After continued contact of the resin particles with hard raw water, the particles' ion exchange capacity is considerably diminished and regeneration of the resin particles must be accomplished, conventionally by contacting the resin particles with a brine solution (i.e., an aqueous solution of sodium chloride or potassium chloride or the like) during a regeneration cycle.

The ion exchange process, which takes place during the regeneration of the ion exchange material, is accomplished in a softener or resin tank of well known construction. A separate brine tank is conventionally used to form brine for use during the regeneration cycle. When regeneration is initiated in the softener system, brine drawn from the brine tank passes through the bed of ion exchange material in the softener tank to reverse the exchange of ions and revitalize the bed by removing hardness inducing ions and replacing them with sodium ions, for example, from the brine.

The amount of brine which is required to regenerate a bed of ion exchange material of a predetermined volume, is dependent upon the extent to which the bed is exhausted during the service cycle. This, in turn, is dependent upon a number of factors, including: (1) the hardness of the water being treated; and (2) the quantity of water treated during the service cycle. The cost of operating the softening system may be reduced by limiting the amount of salt utilized in each regeneration cycle and the frequency of regeneration cycles to only those necessary to regenerate the resin particles.

Most water softeners are designed to regenerate on a predetermined timed cycle that is determined by taking into consideration the above-mentioned factors. The water softening system regenerates itself on the predetermined time cycle even if the water softening system is subjected to either an abnormally high or low usage during a particular period of time. In the instance of abnormally low usage, a waste of salt and water results. In the instance of abnormally high usage, the water softening system is unable to adequately soften all of the water passing through the system.

Many control systems have been proposed to take into account water usage on a real time basis. Such systems have been based upon means which detect the state of exhaustion of the resin bed or means which measure the quantity of water which has passed through the resin bed since the most recent regeneration cycle.

Systems which attempt to detect the state of exhaustion of the resin bed are disclosed in U.S. Pat. Nos. 3,246,759 and 4,257,887. These systems utilize electrodes, mounted in the resin bed, which are connected to a circuit which detects the condition of the resin bed. When the condition of the resin bed is such that rejuvenation should occur, a control circuit is activated to start the regeneration cycle. These systems, which rely on the difference in conductivity between beds of exhausted and rejuvenated resin particles, have not been completely reliable, are relatively expensive, and may result in salt usage that is not always in direct proportion to the volume of water processed.

One example of a softening control system that utilizes a means to measure the quantity of water that has passed through the bed is disclosed in U.S. Pat. No. 3,687,289. This system utilizes a metering device associated with the soft water line to draw off a predetermined proportion of the water flowing from the soft water line. The drawn-off water is directed to a pump chamber having an adjustable water storage capacity. The amount of water drawn off from the soft water line is directly proportional to the storage capacity of a pump chamber. The water stored in the pump chamber is periodically directed to the brine storage tank. The brine storage tank includes means to activate a timer when the water level in the brine tank reaches a predetermined level to signal the need for regeneration. The predetermined proportion of water drawn off is adjusted dependent upon the hardness of the water being treated.

The above discussed water softener system signals a regeneration after the usage of a predetermined amount of soft water. However, the regeneration cycle is usually delayed so as to occur at night. Therefore, the resin bed must have a reserve capacity to provide soft water for the remaining portion of the day after the need for a regeneration is signaled. The reserve capacity is typically selected to be that remaining after approximately 70% of the capacity of the resin bed is used. This large reserve capacity is needed to maintain soft water service in the event that the need for regeneration is signaled early in the day. Although such water softener systems may be designed or adjusted to vary the reserve capacity of the resin bed, once determined, the reserve capacity becomes fixed.

Another known water softener system utilizes a microcomputer to adjust the reserve capacity from day to day in response to soft water usage. The system includes a turbine water meter that measures the quantity of water passing through the resin bed. Based upon the quantity and hardness of the water that has passed through the resin bed, the microcomputer calculates the percentage of the capacity of the resin bed used since the last regeneration. The micro-computer employs an algorithm to make calculations and decisions based on accumulated time and water use. The algorithm allows a large reserve for days immediately following a regeneration and reduces the amount of reserve capacity as more days of significant water usage accumulate since the most recent regeneration. At such time as the reserve capacity for a day is reached, the water softener is scheduled for regeneration that night with a preselected fixed quantity of salt.

A system similar to the just described system utilizes a similar algorithm with additional criteria for reducing the probability of actual usage exceeding the variable reserve. This system determines and stores water average usage for each particular day of the week. At the end of each day, the calculated reserve capacity remaining in the resin bed is determined and compared with the stored water usage average for the next day. If the reserve capacity remaining is not adequate to meet the expected demand on the next day, the water softener is scheduled for regeneration that night with a preselected fixed quantity of salt.

The just described micro-computer systems utilize a variable reserve capacity and are able to schedule regenerations more in proportion to water usage and to thereby more accurately reduce the reserve capacity of the resin bed at the time of regeneration. However, both of these systems use a fixed quantity of salt for each regeneration. That is, the quantity of brine solution directed through the resin bed is the same during each regeneration. Accordingly, in instances where the reserve capacity of the resin bed is relatively high at the time of regeneration, a greater quantity of salt is passed through the bed than is necessary to rejuvenate the resin particles in the bed. As a result, salt is wasted.

Yet another method and system for regeneration of a water softener were disclosed in U.S. Pat. No. 5,544,072. This method and system had a default operating capacity and corresponding salt dose at midrange capacity. Since the majority of applications have relatively low hardness in relation to the capacity of the softener used, the actual operating capacity is typically adjusted downward to improve the overall salt efficiency of the softener. The result of starting at the midrange operating capacity, causes the softener to use more salt then necessary, at least initially.

The method also calculated the average percentage of capacity used for each day of the week to predict whether or not there is enough capacity remaining in the softener to cover the water usage required for the next day. The method reserves the next day's daily average plus an additional 50% of the daily average (i.e., the daily average*1.5). For example, if on a given day the average percent of capacity used was 40%, the patent will reserve 40%*1.5, or 60% for that days usage.

While this system and method works, in operation, the assumption to use an additional 50% of the daily average can over or under reserve the amount of the capacity needed in many instances. For example, if the consumer uses a very constant amount of water such as an average of 40% per day, the method and system will reserve 60% for that day, but it would only need to reserve 40%. If a softener had 45% of its capacity remaining, the additional reserve would cause the softener to regenerate prematurely, wasting regeneration water, and salt. In a second example, if the consumer uses 10% of the capacity on a given day, one week later the consumer uses 90% of the operating capacity, and this pattern is repetitive, then the average capacity for that given day of the week is 50%. The patent would reserve 50%*1.5 (or 75%) for that day. If the softener had 76% of its capacity remaining the day before the 90% usage day, it would not regenerate. That would mean the customer would have hard water the next day amounting to 14% of operating capacity.

SUMMARY OF THE INVENTION

Accordingly, it is an object of this invention to provide a demand initiated method for regenerating a water softener which will maximize the efficient use of salt (including increasing the initial salt efficiency of the water softener) and minimize the use of water for regeneration, and prevent the exhaustion of the softening ability of the ion exchange resin bed prior to a regeneration. It is a further object of this invention to operate the softener ion exchange bed over a capacity range wherein the resin is most efficiently restored by exposure to brine.

In accordance with this invention, a water softener system is provided that employs a method of regeneration which both maximizes the efficient use of salt and minimizes the use of water for regeneration. With usage following normal usage patterns for the system, the method of regeneration employed by the system also prevents the exhaustion of the softening ability of the ion exchange resin bed prior to a regeneration. Further, the method of operating the system causes the ion exchange bed to function over a capacity range wherein the resin is most efficiently restored by exposure to brine.

The water softener system of the present invention is operated according to a method which measures the amount of softening capacity of resin bed used since the last regeneration, adjusts the reserve capacity periodical in accordance with soft water usage, and further employs a method of determining the quantity of salt to be used during each regeneration of the system. The system of this invention employs automatic means to make efficient use of the water softener's residual capacity which remains when the softener's resin bed is regenerated prior to complete exhaustion. The present invention further maximizes the efficient use of salt during each regeneration by selecting a quantity of salt needed to regenerate the resin bed to a preselected design capacity, which preselected design capacity is less than the maximum or theoretical capacity of the resin bed. More specifically, the method of regenerating a water softener in accordance with this invention, includes making an initial selection of a design exchange capacity to which the resin bed is to be regenerated during each regeneration cycle. This design exchange capacity is preferably approximately equal to the exchange capacity in grains of the resin bed at that particular salt dosage wherein the exchange capacity in grains of the bed divided by the particular salt dosage in pounds is at least approximately 3350. It has been determined that such a design exchange capacity makes efficient use of the brine solution during each regeneration cycle.

In addition to calculating the daily water usage, the method of the present invention calculates the variability for each day of the week. In particular, for each day, the method calculates the difference from the day's average. The difference is then itself averaged to yield a variability factor for that day. If the water pattern for any given day is fairly constant, the variability factor will be small and the average water usage for that day will be an accurate basis for the estimated water usage. If the water pattern for any given day is highly variable, the variability factor will be large and the average water usage for that day will be quite inaccurate.

The system is regenerated, when at the end of any preselected time period, the amount of exchange capacity of the resin bed used since the most recent regeneration plus the variation of exchange capacity used on the next day of the week plus the average exchange capacity of the resin bed used on the next day of the week is greater than the selected design exchange capacity. The resin bed is regenerated with a brine solution made with a salt dosage which is approximately equal to that which is necessary to regenerate the resin bed to its design capacity.

Prior to using the system of this invention, the exchange capacity of the resin bed is determined for various salt dosages. The exchange capacity of the resin bed for each particular salt dosage is approximately equal to the capacity of the resin bed subsequent to regeneration with the particular salt dosage, after having been exhausted to one grain hardness. This procedure is repeated for different salt dosages to determine the exchange capacity of the resin bed for various predetermined salt dosages.

After a period of use following a regeneration, the available exchange capacity of the resin bed is determined by subtracting the exchange capacity of the resin bed used since the last regeneration from the selected design capacity of the resin bed. The exchange capacity of the resin bed used since the last regeneration is determined by measuring the volume of water passing through the resin bed since the last regeneration and multiplying that volume by the hardness of the water. The salt dosage to be used during the next regeneration cycle is determined by subtracting the salt dosage required to provide the available exchange capacity from the salt dosage required to provide the design exchange capacity.

Apparatus in accordance with this invention utilizes a turbine water meter located in the soft water outlet line of the water softener to measure the water usage in gallons since the last regeneration. A micro-computer is provided which is programmed to receive an input from the water meter, an input of the grains of hardness of processed water, and to automatically make the necessary calculations to determine when to regenerate the resin bed and to determine the proper salt dosage in terms of water fill time to the brine tank prior to each regeneration.

The regeneration of a resin bed of the water softener in accordance with the above method and apparatus fully restores the resin bed to its design capacity upon completion of each regeneration cycle. The amount of saturated brine in the brine tank prior to each regeneration is just enough to restore the resin bed to its design capacity.

DETAILED DESCRIPTION OF THE INVENTION

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Figure 1:
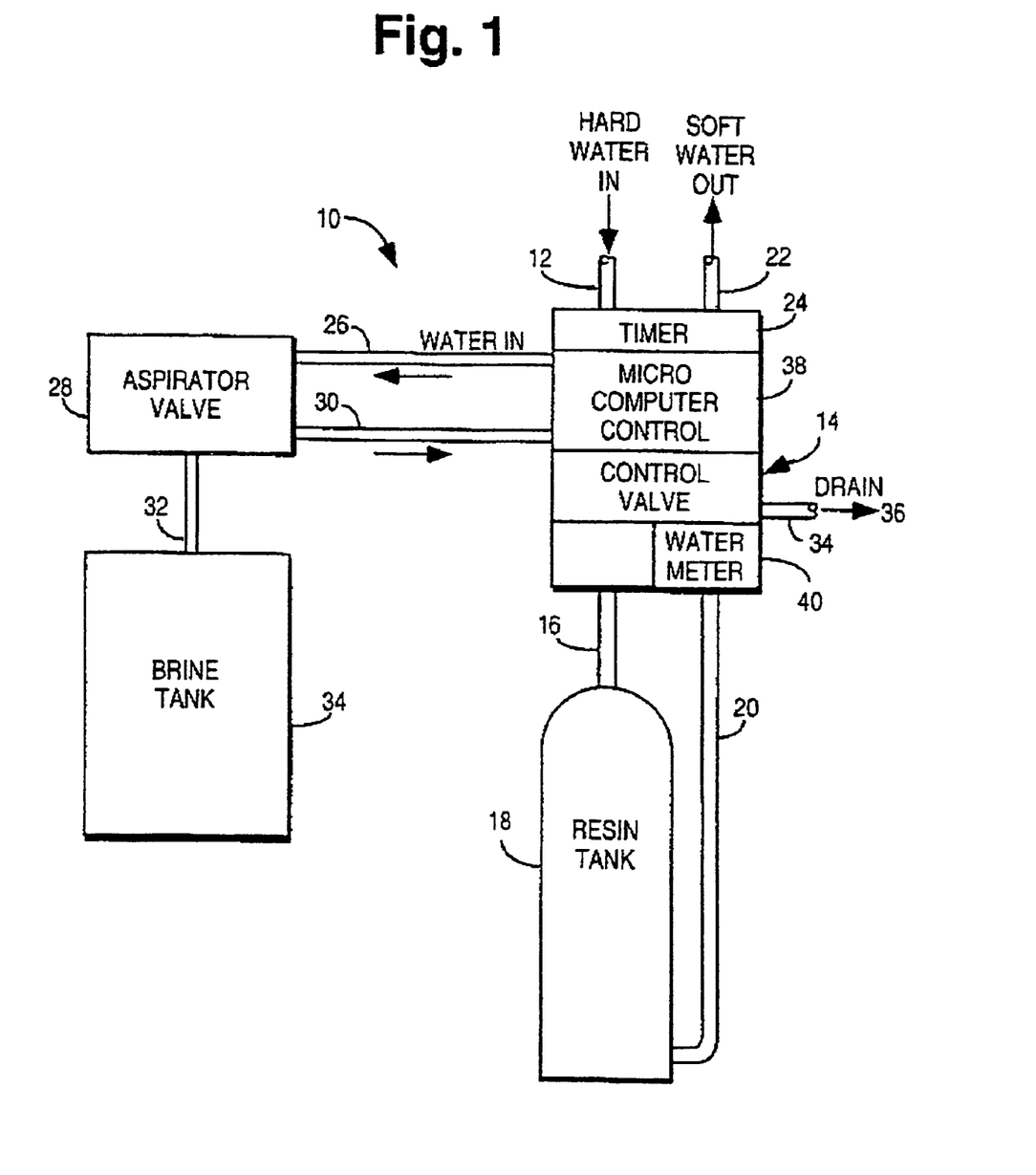
FIG. 1 is a schematic representation of an automatic water conditioning system of the general type which embodies the present invention.

To assist in the understanding of the water softener regeneration control system of this invention, a schematic diagram of a water conditioning system of conventional construction as shown in FIG. 1 will be described. The system 10 is designed to soften water when it is delivered to a residence or business for use during what is typically called the "service cycle" of the system. Periodically, the system 10 must be regenerated to restore its softening capability. The system 10 is regenerated by the use of a brine solution during a "regeneration cycle". The present invention is concerned with the control of the regeneration cycle.

During a service cycle, raw or hard water is passed through a supply pipe 12 to a control valve 14. The control valve 14 supplies the raw water through a pipe 16 to a tank 18 that contains a bed of ion exchange resin particles. The raw water passes through the bed of resin and is withdrawn from the tank 18 through an outlet pipe 20. The water withdrawn through the outlet pipe 20, which has been softened by contact with the ion exchange resin, again passes through the control valve 14 to a service pipe 22.

When the ion exchange resin losses its capacity to effectively soften the water passing through it, regeneration is necessary. A regeneration cycle typically includes cycles to backwash and rinse the resin. Those cycles are followed by a brine cycle during which a brine solution flows through the ion exchange resin particles. A timer 24 initiates the brine cycle by actuating the control valve 14 to direct water from the supply pipe 12 through a pipe 26 and aspirator valve 28 to pipe 30. The flow through pipe 30, which passes through control valve 14, is directed by the control valve to outlet pipe 20. The water from pipe 26 passing through the aspirator valve 28 creates a pressure reduction by Venturi effect in a pipe 32 that extends to near the bottom of a brine tank 34. Due to the pressure reduction, brine is drawn from the brine tank 34 through the pipe 32 and flows with the water through pipe 30, control valve 14, and pipe 20 to the bottom of resin tank 18. The flow of brine through the ion exchange resin particles removes the hardness creating ions and carries them, with the discharge water, through pipe 16 and control valve 14 to a drain 36. The flow of water through pipe 26 as controlled by timer 24 is continued long enough to withdraw all of the brine available to the pipe 32 in the brine tank 34. Thereafter, the control valve 14 stops the flow of water to pipe 26 from pipe 12 and, instead, directs it to outlet pipe 20 to backwash the ion exchange resin particles. Prior to the next regeneration cycle, water from the supply pipe 12 is directed by the control valve 14 to the brine tank 34 to create brine for the next regeneration cycle. In accordance with this invention, the softening system 10 also includes a microprocessor control 38 and a water meter 40.

The present invention is directed to an improved method and apparatus for controlling the regeneration cycle so as to provide improved efficiency in the use of salt and water for regeneration, while at the same time insuring that softening capacity will not be lost between regeneration cycles.

Figure 2:
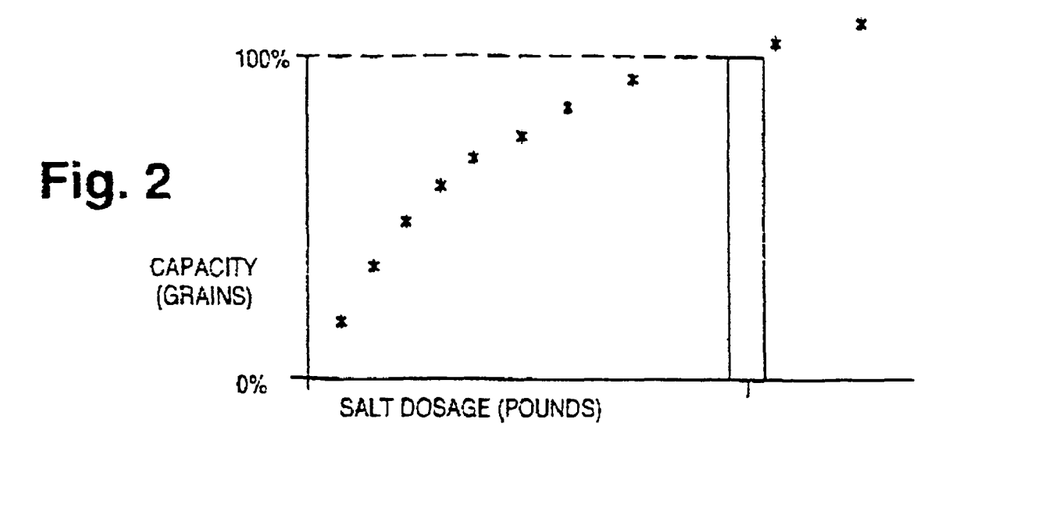
FIG. 2 is a chart showing a typical relationship between softening capacity in grains and salt dosage.

Referring to FIG. 2, a theoretical salt versus capacity curve for an ion exchange resin bed is shown. The amount of ion exchange resin in the resin tank will determine the maximum theoretical operating capacity of the softener. However, operating the softener at its maximum theoretical capacity point, results in relatively inefficient salt usage. If the softener is operated at lower points on the salt/capacity curve, the salt efficiency will increase. In accordance with the method of this invention, the softener control is designed to force the softener to operate on the lower, more efficient portion of the salt/capacity curve.

The volume of water flow through the resin tank 18 from the pipe 12 to the pipe 22 is measured by the water meter 40. The softening capacity used since the last regeneration is determined by multiplying the quantity of water used, as measured by the water meter 40, by the predetermined hardness of the hard water entering the resin bed through the pipe 12. Softening capacity is typically expressed in term of grains of hardness. The total softening capability of the system following a regeneration can be expressed in terms of grains of hardness, as can the amount of softening capacity which has been used since the last regeneration.

Figure 3:
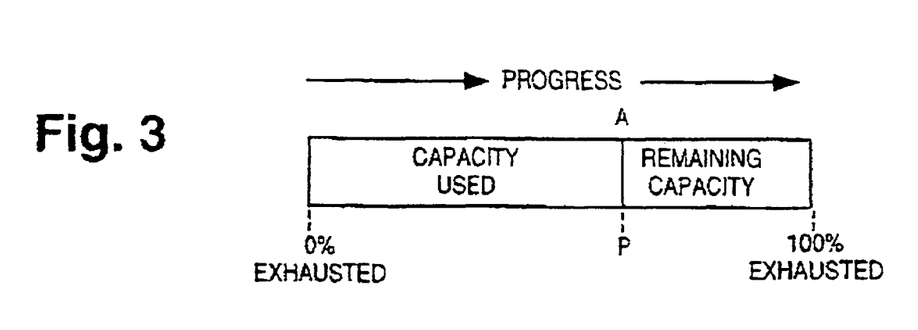
FIG. 3 is a graphic representative of the terms used in referring to the softening capacity of a water softener.

Referring to FIG. 3, which is a capacity bar chart, terms used in setting forth the use of softening capacity of a softener in terms of its last regenerated capacity will be explained. Immediately following the regeneration of the resin bed, the full regenerated capacity is available as represented by 0% Exhausted on the left. As the softener is used to soften water, the used softening capacity is represented by the portion of the bar chart labeled "Capacity Used". The exhaustion of the softening capacity of the resin bed is indicated on the right of FIG. 3 by 100% Exhaustion. Thus, the portion of the bar chart to the right of the line identified by the letter "P" represents the remaining capacity. As indicated by the arrow at the top of FIG. 3, progress represented by the letter "P" is measured in terms of the portion of the capacity available after the last regeneration that has been used.

One procedure that has been used for determining when the resin bed should be regenerated is based upon reserving a fixed amount, typically 30% of the total regenerated capacity. Thus, when use exceeds 70% of the total regenerated capacity, a regeneration is scheduled.

Figure 4:
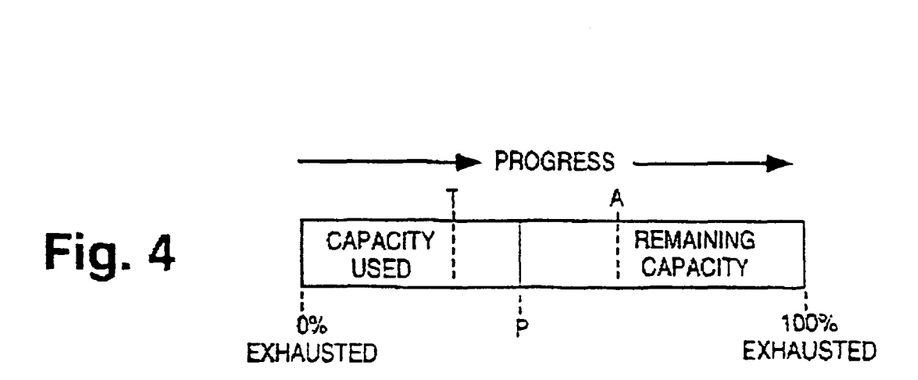
FIG. 4 is a graphic representative of the terms used in referring to the softening capacity of a water softener and the term used in describing the method of this invention.

Referring now to FIG. 4, added to the capacity bar chart of FIG. 3 are two additional values, one of which is a "threshold capacity" as indicated by the letter "T" and an "allocated capacity" as indicated by the letter "A". In accordance with the method of this invention, regeneration of a water softener resin bed is based upon comparing the percentage of capacity used to a range of capacity values, the lower limit of which is defined as a Threshold Capacity and the higher limit of which is defined as an Allocated Capacity. In a preferred embodiment of this invention, ten index levels, or ranges of capacity vales are established. The percentage of capacity used or "progress" is compared to one of the index levels. The threshold and allocated capacities are determined by the following formula:

$$T = N/(N+2)$$

$$A = (N+1)/(N+2)$$

Where:
T=Threshold Capacity
A=Allocated Capacity
N=Index Level
Using these formulas for establishing the threshold and allocated capacities, their percentage values for index levels 0 through 9 are shown in the chart of FIG. 5.

In accordance with the method of this invention for controlling regeneration, if the progress since the last regeneration is less than the threshold capacity of the index level currently being used, no action with respect to initiating a regeneration will be taken, and the progress will be compared against the same index level for successive days as long as the progress does not exceed the threshold capacity. The progress will continue to be compared to the threshold and allocated capacities of the same index level on a daily basis until the progress is greater than the threshold capacity. When the threshold capacity is exceeded, the next index level will be used for comparison with the progress on the next day.

Figure 5:
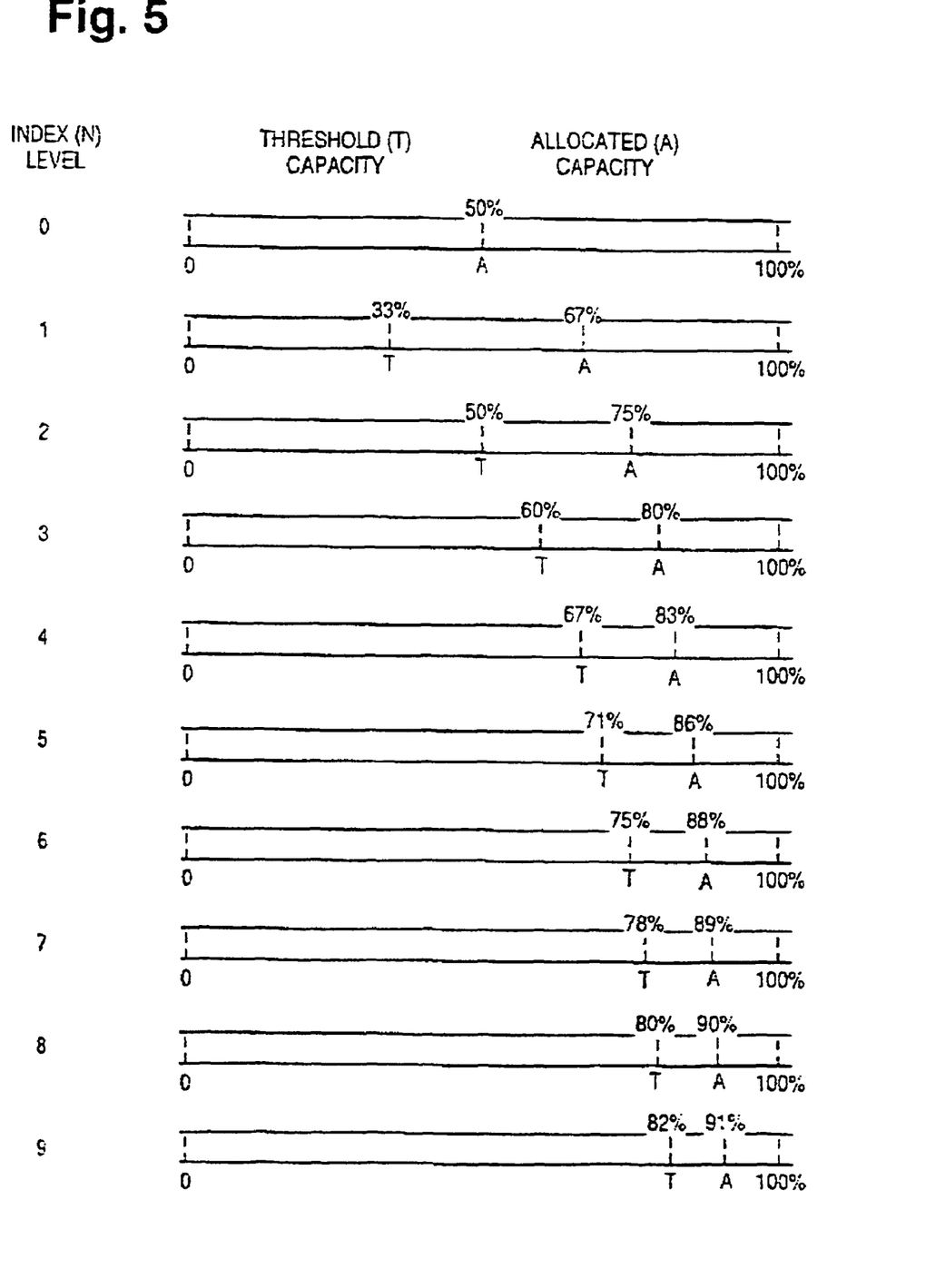
FIG. 5 is a chart of the values of threshold capacities and allocated capacities by index levels in accordance with the method of this invention.

Since the threshold value for the index level 0 as shown in FIG. 5 is 0, should there be use of capacity on the first day, the method of this invention will be indexed to the first level. As the progress is compared on a daily basis with the current index level, should the threshold value be exceeded but not the allocated value, the progress comparison on the subsequent day will be at the next index level. However, if, on any day, the comparison shows the allocated capacity for the current index level to have been exceeded, a regeneration of the resin bed will be scheduled. In summary, in accordance with this method of controlling the scheduling of regeneration, the incrementing of the index level to the next level can only occur once per day, and if the index level is changed, it will only change at the time of day when a regeneration occurs if one is called for.

Figure 6:
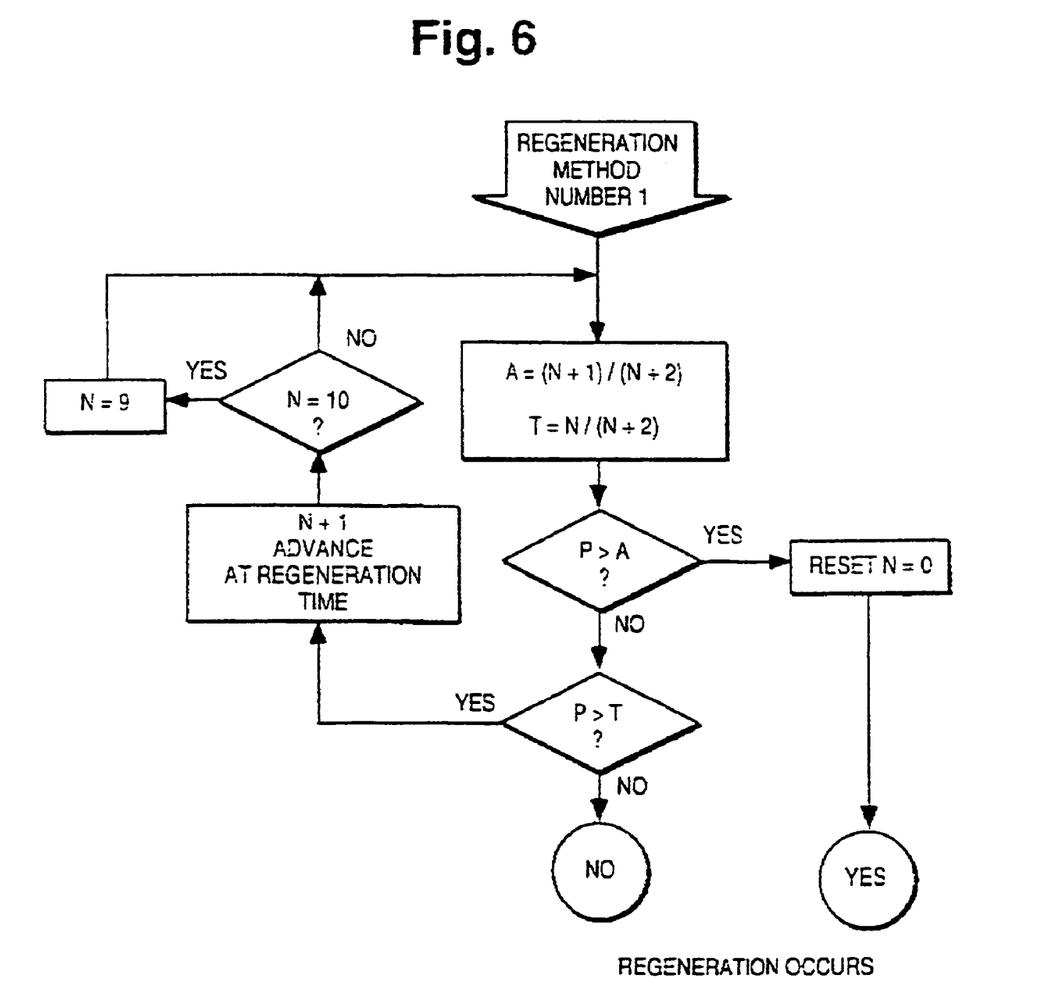
FIG. 6 is a flow chart illustrating the sequence of steps undertaken by a microprocessor in controlling the regeneration of a softener in accordance with one aspect of the method of this invention.

FIG. 6 schematically represents the routine for scheduling a regeneration of the resin bed of a softener in accordance with one aspect of the method of this invention. That is, in accordance with this regeneration method (1), the comparison of progress to the threshold and allocated capacities for the index levels set forth in FIG. 5. With threshold and allocated values for index levels determined in accordance with the formula previously set forth, in accordance with this regeneration method (1), if progress as represented by the letter P is greater than allocated value as represented by the letter A, then the index level N is reset to 0 and a regeneration scheduled. If the progress is not greater than the allocated value and further is not greater than the threshold value, then a regeneration is not scheduled. However, if the progress is not greater than the allocated value but is greater than the threshold value, then the index level is advanced by 1. If the index level is not 10, the allocated and threshold values at the next index level are utilized for the following day's comparison. If the index level is equal to 10, it is reset to 9 for use in the next day's comparison.

The method for controlling the regeneration of a water softener resin bed in accordance with this invention also takes into consideration the day of the week. As will be hereinafter described, if the previous method for determining whether or not a regeneration should be scheduled does not call for a regeneration, then a regeneration may be scheduled based upon a comparison with a historical day of the week usage. In accordance with this aspect of the method of this invention, at the beginning of each day, the current percent capacity used (progress) is stored as a reference value $P_r$. At the end of each day, the current day's water usage (U) is calculated by subtracting the progress at the beginning of the day ($P_r$) from the progress at the end of the day (P) as set forth in the following formula:

$$U = P - P_r$$

Figure 7:
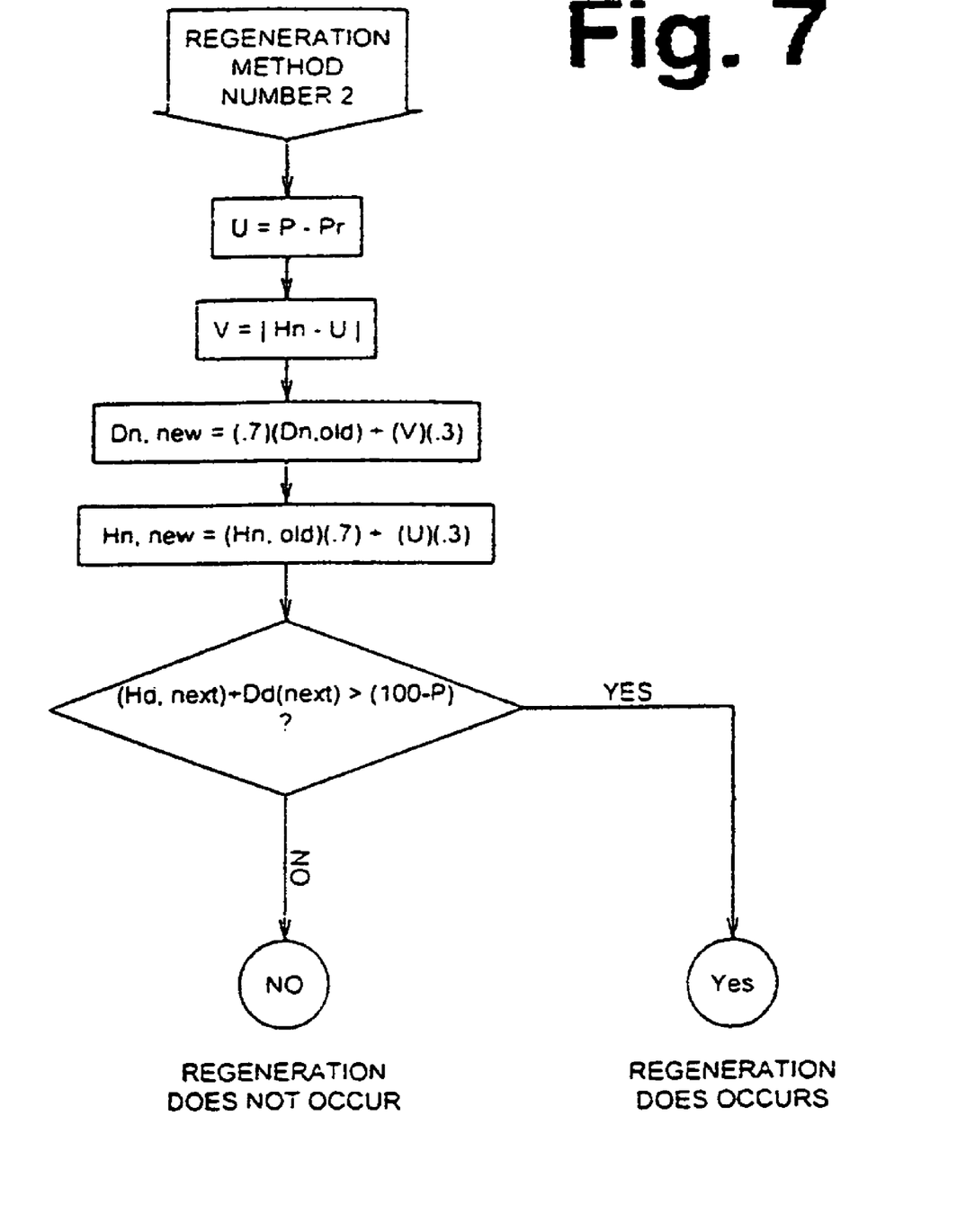
FIG. 7 is a flow chart illustrating the sequence of steps undertaken by a microprocessor in creating historic and variability day of the week usages of softening capacity, and for scheduling a regeneration based thereon in accordance with one aspect of this invention.

FIG. 7 schematically represents the routine for scheduling a regeneration of the resin bed of a softener in accordance with another aspect of the method of this invention. The recorded water usage is used to determine if the remaining softening capacity is large enough for the predicted next day's water usage. The predicted usage is based on historically what the usage has been during the week. As explained below, recharge will be initiated if the next days predicted usage exceeds the current remaining capacity.

At the recharge time, the current percent of capacity used (progress) is stored as a reference value ($P_r$). At the next recharge time, the current day's water usage (U) will be calculated by subtracting the progress at the beginning of the day from the progress at the end of the day.

$$U = P - P_r$$

In accordance with this regeneration method, the variance from the historical weighted daily average (V) can also be calculated by subtracting the current day's water usage from the old historical daily capacity and taking the absolute value.

$$V=|H(d)-U|$$

The new historical daily difference D'(d) will then be updated according to the formula:

$$D'(d)=0.7D(d)+0.3V$$

The new historical daily capacity H'(d) will then be updated using the following formula:

$$H'(d)=0.7H(d)+0.3U$$

Recharge will occur if the following is true:

$$H'(d+1)+D'(d+1)>100-P$$

As an example, if the next day's historical water usage H(d+1) is predicted to be 200 gallons and the average difference D(d+1) is 100 gallons, the control will calculate to see if 200 gallons+100 gallons or 300 gallons of capacity is remaining in the resin tank. If the calculated remaining capacity is less than 300 gallons, the control will regenerate the resin tank.

The method of this invention also involves a variable capacity calculation which is based upon a variable reserve and a variable salt dosage. For a particular water softener resin bed, five index capacities ($I_c$) P are established. For the initial regeneration of the resin bed, the most efficient salt setting (i.e., the lowest salt dose setting) is chosen as the default operating capacity. The variable capacity feature permits the regeneration of the softener to be adjusted to the water hardness and usage pattern of a particular installation. The decision to change the index capacity is based upon the following formula:

$$H_n=(0.7)(H_n,old)+(0.3)(N_d)$$

Figure 8:
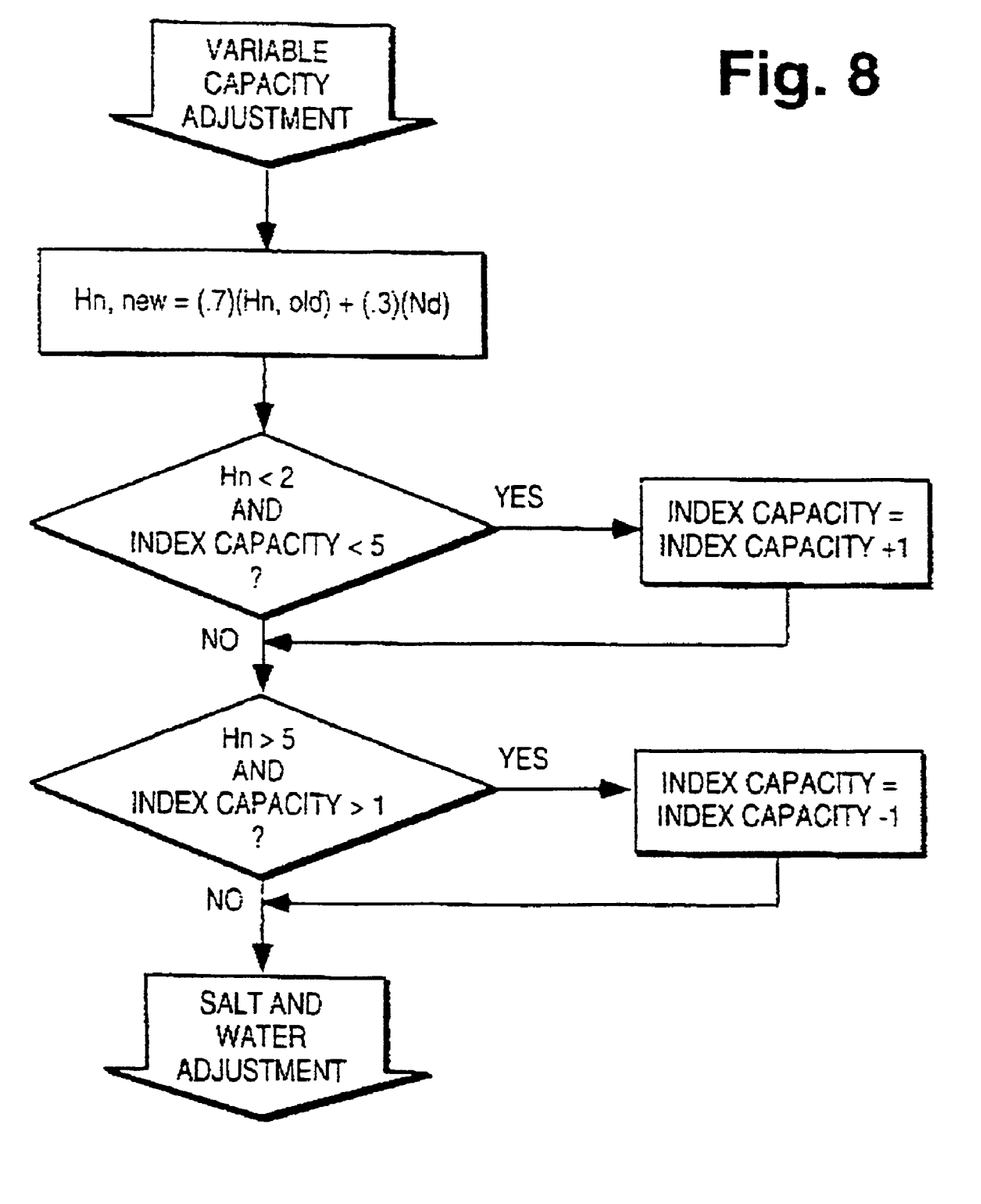
FIG. 8 is a flow chart illustrating the sequence of steps undertaken by a microprocessor in adjusting the amount of saturated brine to be used for a regeneration based on the number of days between regenerations.

Where:
$H_n$=Historical number of days between regenerations
$N_d$=Number of days since a regeneration FIG. 8 schematically represents the routine for making the variable capacity adjustment in accordance with one aspect of the method of this invention. A new historic number of days between regenerations is calculated in accordance with the formula set forth above. If the new historic number of days between regenerations is less than two and the index capacity is less than five, the index capacity is increased by one. That is, if the index capacity were at the initialization level of one, it would be increased to two. If the new historic number of days is not less than two and the index capacity not less than five, but the historic number of days is greater than five and the index capacity greater than one, the index capacity is decreased by one. That is, if the index capacity were at the value of three, it would be decreased to two. The newly determined index capacity is then utilized in still another step in the method of this invention (i.e., that of a salt and water adjustment).

Assuming that there is enough salt available to create a saturated brine solution of any amount of water to be used as brine, the salt dosage may be adjusted by adjusting the amount of water utilized to form the saturated brine. At the time of regeneration, there will typically be, and in fact should be, in accordance with the method of this invention, softening capacity remaining. That is, the progress should always be less than 100% when a regeneration is scheduled. The remaining or residual capacity of the resin bed may be expressed in terms of the amount of salt (or saturated brine) required to provide the remaining or residual capacity in the resin bed. It being desirable to only use the amount of salt required to restore the softener to its original capacity, the residual or remaining capacity should be taken into account so as to reduce the amount of salt used. The residual salt content for a high percentage progress (that is, the resin bed approaching exhaustion) can be approximated as:

$$SR=(100-P)/100*OPC/TCS$$

Where:
SR=Residual salt
P=Progress to exhaustion (expressed in percentage)
OPC=Operating capacity (in grains)
TCS=Theoretical capacity of salt (5995 grains/lb)

The adjusted salt dosage (SDA) is then determined by subtracting the residual salt (SR) from the operating salt dosage (OPS) which may be expressed as follows:

$$SDA=OPS-SR$$

Figure 9:
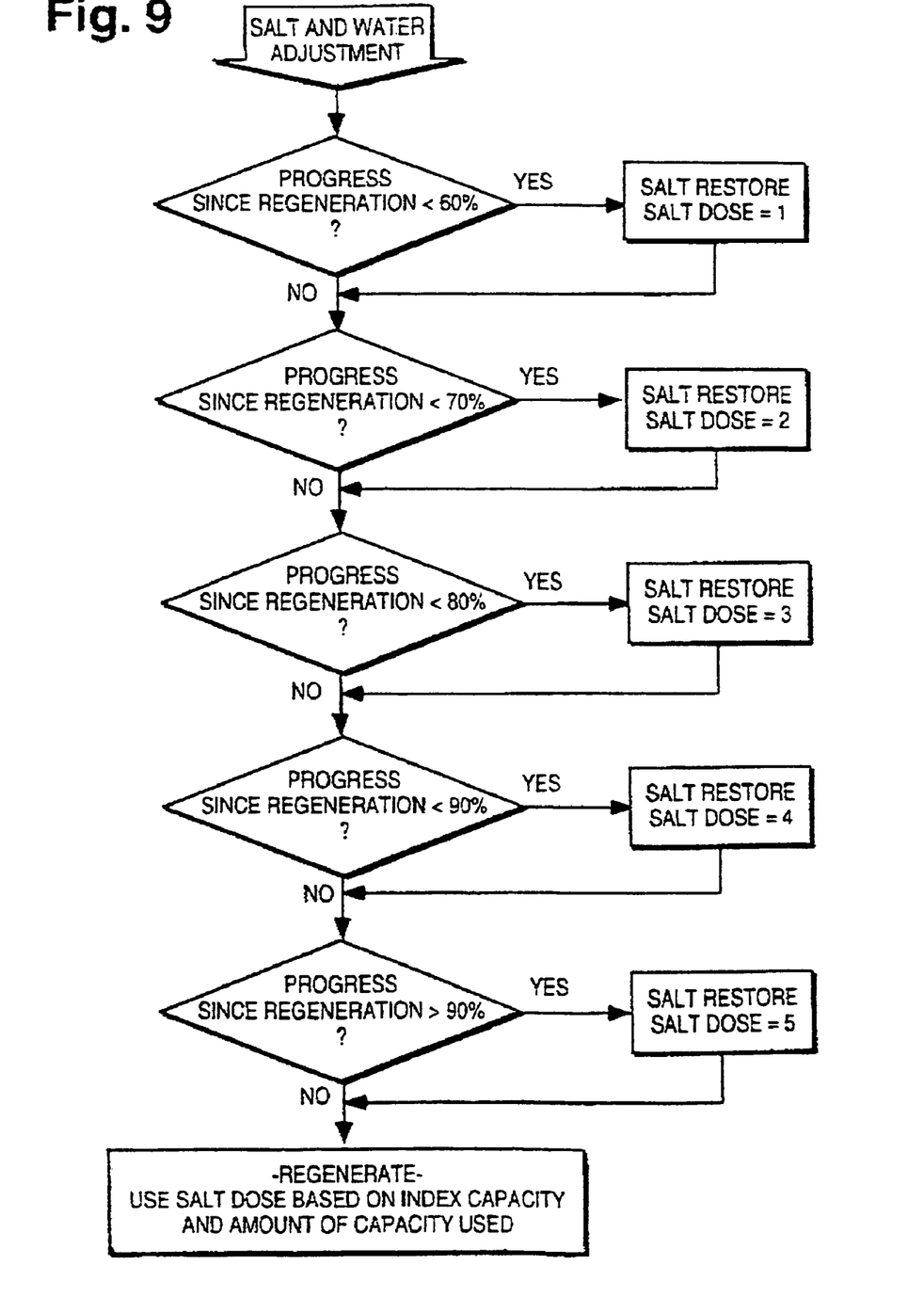
FIG. 9 is a flow chart illustrating the sequence of steps undertaken by a microprocessor in determining the amount of saturated brine to be used for a regeneration based on upon the capacity used or progress since the last regeneration.

Referring to FIG. 9, a schematic representation of the routine implemented by a microprocessor for determining the salt dosage to be used for the next regeneration is set forth. If the progress since the last regeneration is less than 60%, the salt dosage to be used to restore the softener should be at the lowest level, or number 1. However, if the progress since the last regeneration is greater than 60%, but less than 70%, the second salt dosage should be used. Similarly, if the progress is greater than 70% but less than 80%, the third salt dosage level should be used. If the salt dosage is greater than 80% but less than 90%, the fourth salt dosage level is used. Finally, if the progress since the last regeneration is greater than 90%, the fifth salt dosage level is used for the next regeneration.

Figure 10:
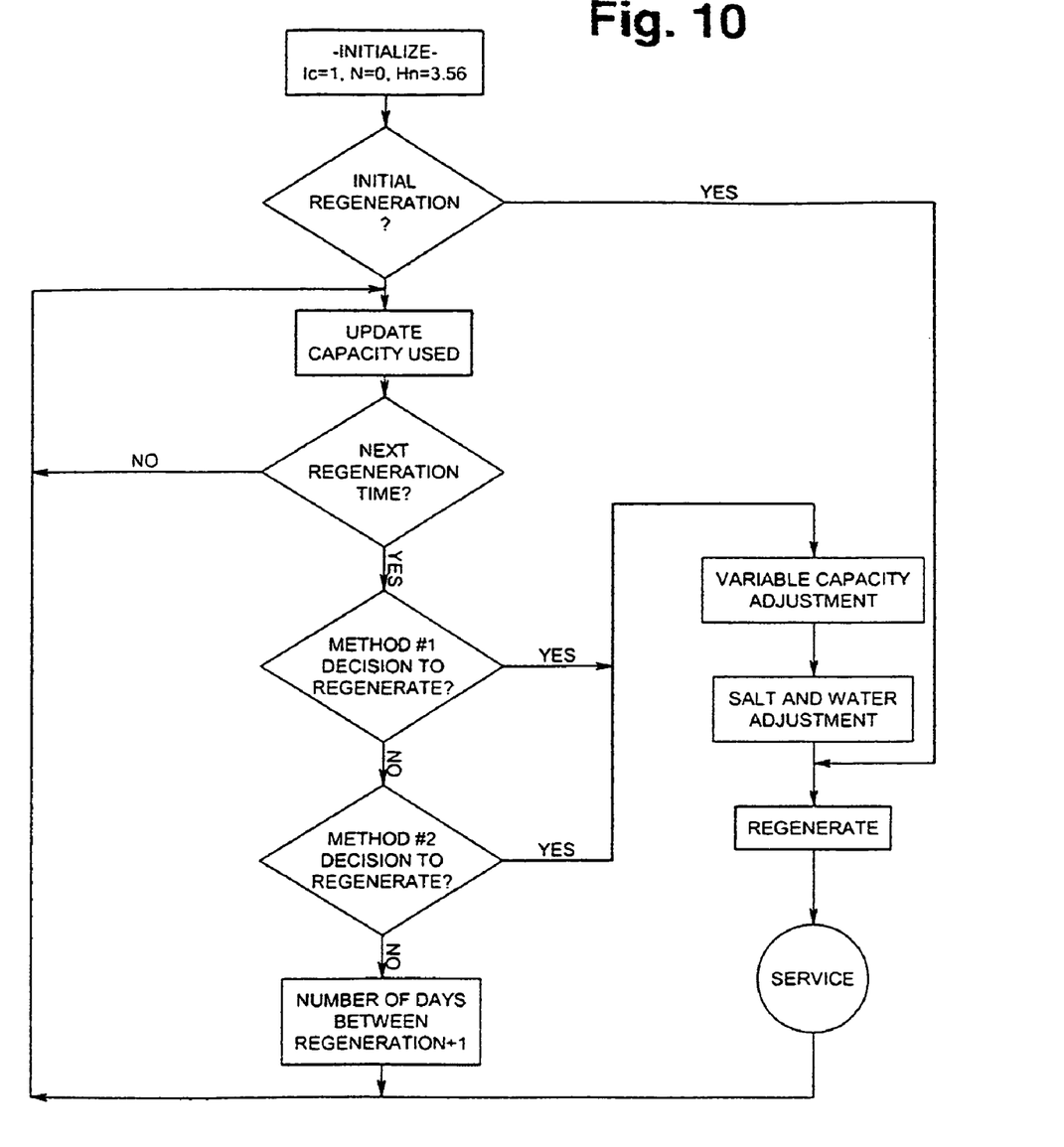
FIG. 10 is a flow chart illustrating the sequence of steps undertaken by a microprocessor in controlling the regeneration of the resin bed of a water softener employing all aspects of this invention.

Referring to FIG. 10, a schematic representation of the overall routine for scheduling the occurrence and controlling the variables of a regeneration in accordance with all aspects of the method of this invention is set forth.

The invention claimed is:

1. A system for scheduling regeneration of a resin bed of a water softener based upon the remaining available exchange capacity of the resin bed, the system comprising: a microcomputer control configured to,
   determine when a regeneration of the resin bed should be scheduled, the microprocessor further configured to,
   i) determine the average amount of exchange capacity used and variation from the average amount of exchange capacity used on each day of the week by monitoring and recording on a daily basis the quantity of water of a predetermined hardness passing through the softener, and
   ii) schedule a regeneration when the amount of exchange capacity of the resin bed used since the most recent regeneration plus the variation from the average amount of exchange capacity used on the next day of the week plus the average amount of exchange capacity of the resin bed used on the next day of the week is greater than the remaining available exchange capacity of the resin bed.

2. A method implemented by a computer that has been programmed with a routine that causes the computer to function as a regeneration scheduling apparatus that schedules regeneration of a resin bed of a water softener based upon the remaining available exchange capacity of the resin bed, wherein the water softener has a default exchange capacity, the routine capable of performing the acts of:
   a) selecting, by executing the routine in the computer, a design exchange capacity to which the resin bed is to be regenerated at the next regeneration where a default design exchange capacity is the lowest capacity of a previously defined range of design exchange capacities, i) determining the average number of days between successive prior regenerations, ii) increasing the design exchange capacity when the average number of days between regenerations falls below a predetermined minimum number of days, iii) decreasing the design exchange capacity when the average number of days between regenerations exceeds a predetermined maximum number of days, b) determining, by executing the routine in the computer, when a regeneration of the resin bed should be scheduled by, i) determining the average amount of exchange capacity used and variation from the average amount of exchange capacity used on each day of the week by monitoring and recording on a daily basis the quantity of water of a predetermined hardness passing through the softener, ii) scheduling a regeneration when the amount of exchange capacity of the resin bed used since the most recent regeneration plus the variation from the average amount of exchange capacity used on the next day of the week plus the average amount of exchange capacity of the resin bed used on the next day of the week is greater than the selected design exchange capacity, and c) regenerating, by executing the routine in the computer, the resin bed to the selected design exchange capacity.

3. A method implemented by a computer that has been programmed with a routine that causes the computer to function as a regeneration scheduling apparatus that schedules regeneration of a resin bed of a water softener based upon the remaining available exchange capacity of the resin bed, the routine capable of performing the acts of:

determining, by executing the routine in the computer, when a regeneration of the resin bed should be scheduled by, i) determining, by executing the routine in the computer, the average amount of exchange capacity used and variation from the average amount of exchange capacity used on each day of the week by monitoring and recording on a daily basis the quantity of water of a predetermined hardness passing through the softener, and ii) scheduling, by executing the routine in the computer, a regeneration when the amount of exchange capacity of the resin bed used since the most recent regeneration plus the variation from the average amount of exchange capacity used on the next day of the week plus the average amount of exchange capacity of the resin bed used on the next day of the week is greater than the remaining available exchange capacity of the resin bed.

4. The method of claim 3, wherein the water softener has a default exchange capacity, wherein the routine is capable of performing the acts of:

a) selecting, by executing the routine in the computer, a design exchange capacity to which the resin bed is to be regenerated at the next regeneration where a default design exchange capacity is the lowest capacity of a previously defined range of design exchange capacity, b) determining, by executing the routine in the computer, when a regeneration of the resin bed should be scheduled by, i) establishing a progression of capacity ranges, a threshold capacity defining the lower limit of each range, and an allocated capacity defining the upper limit of each range, said threshold capacities and said allocated capacities each being expressible as a percentage of the selected design exchange capacity, ii) selecting from said progression of capacity ranges a particular capacity range against which the remaining available exchange capacity of the resin bed, as a percentage of the selected design exchange capacity, is compared, iii) determining the amount of exchange capacity of the resin bed, as a percentage of the selected design exchange capacity, which has been used since the most recent regeneration, and iv) scheduling a regeneration of the resin bed when the amount of exchange capacity of the resin bed used since the most recent regeneration is greater than the allocated capacity of the selected capacity range, c) whereby said design exchange capacity is selected, by executing the routine in the computer, by, i) determining the average number of days between successive prior regenerations, ii) increasing the design exchange capacity when the average number of days between regenerations falls below a predetermined minimum number of days, and iii) decreasing the design exchange capacity when the average number of days between regenerations exceeds a predetermined maximum number of days.

5. The method of claim 4, wherein, by executing the routine in the computer, said threshold capacity defining the lower limit for a first capacity range is set at naught percent, and said allocated capacity defining the upper limit of said first capacity range is set at fifty percent of said selected design exchange capacity.

6. The method of claim 5, wherein, by executing the routine in the computer, said threshold capacity is represented by the formula $N/(N+2)$, said allocated capacity is represented by the formula $(N+1)/(N+2)$, and N represents the number of the step in the progression as N increases from 0 to 9.

7. The method of claim 6, wherein, by executing the routine in the computer, as the threshold value of the presently selected capacity range is exceeded, the next capacity range is selected, against which the remaining available exchange capacity of the resin bed, as a percentage of the selected design exchange capacity, is compared.

8. The method of claim 4, wherein, by executing the routine in the computer, as the threshold value of the presently selected capacity range is exceeded, the next capacity range is selected, against which the remaining available exchange capacity of the resin bed, as a percentage of the selected design exchange capacity is compared.

9. The method of claim 4, wherein, by executing the routine in the computer, said threshold capacity and said allocated capacity defining each successive capacity range in said progression of capacity ranges being a greater percentage of the selected design exchange capacity than said threshold capacity and said allocated capacity defining the prior capacity range, with said threshold capacity increasing by a larger percentage of said selected design capacity than said allocated capacity for each successive capacity range, such that each successive capacity range becomes narrower.

10. The method of claim 4, the routine further capable of performing the act of:

c) determining, by executing the routine in the computer, the quantity of saturated brine to be used for each regeneration cycle, i) establishing the approximate exchange capacity of the resin bed resulting from regenerating the resin bed from a predetermined state of exhaustion for each of a progression of different quantities of saturated brine, ii) determining the approximate remaining available exchange capacity of the resin bed immediately prior to regeneration, iii) determining a first quantity of saturated brine required to regenerated the resin bed to the selected design exchange capacity from the predetermined state of exhaustion, iv) determining a second quantity of saturated brine required to regenerate the resin bed to the approximate remaining available exchange capacity of the resin bed, from the predetermined state of exhaustion, v) determining a preferred quantity of saturated brine required to regenerate the resin bed to the design exchange capacity, by subtracting the second quantity of saturated brine from the first quantity of saturated brine, and vi) passing said preferred quantity of saturated brine through said resin bed to regenerate the resin bed to the selected design exchange capacity.

11. The method of claim 10, wherein said design exchange capacity is selected, by executing the routine in the computer, by, a) determining the average number of days between successive prior regenerations, b) increasing the design exchange capacity when the average number of days between regenerations falls below a predetermined minimum number of days, and c) decreasing the design exchange capacity when the average number of days between regenerations exceeds a predetermined maximum number of days.

12. A method implemented by a computer that has been programmed with a routine that causes the computer to function as a regeneration scheduling apparatus that schedules regeneration of a resin bed of a water softener based upon the remaining available exchange capacity of the resin bed, the routine capable of performing the acts of:

a) selecting, by executing the routine in the computer, a design exchange capacity to which the resin bed is to be regenerated at the next regeneration, b) determining, by executing the routine in the computer, when a regeneration of the resin bed should be scheduled by, i) establishing a progression of capacity ranges, a threshold capacity defining the lower limit of each range, and an allocated capacity defining the upper limit of each range, said threshold capacities and said allocated capacities each being expressible as a percentage of the selected design exchange capacity, ii) selecting from said progression of capacity ranges a particular capacity range against which the remaining available exchange capacity of the resin bed, as a percentage of the selected design exchange capacity, is compared, iii) determining the amount of exchange capacity of the resin bed, as a percentage of the selected design exchange capacity, which has been used since the most recent regeneration, iv) scheduling a regeneration of the resin bed when the amount of exchange capacity of the resin bed used since the most recent regeneration is greater than the allocated capacity of the selected capacity range, and c) determining, by executing the routine in the computer, when a regeneration of the resin bed should be scheduled by, i) determining the average amount of exchange capacity used and variation from the average amount of exchange capacity used on each day of the week by monitoring and recording on a daily basis the quantity of water of a predetermined hardness passing through the softener, ii) scheduling a regeneration when the amount of exchange capacity of the resin bed used since the most recent regeneration plus the variation from the average amount of exchange capacity used on the next day of the week plus the average amount of exchange capacity of the resin bed used on the next day of the week is greater than the selected design exchange capacity.

13. The method of claim 12, wherein said design exchange capacity is selected, by executing the routine in the computer, by, a) determining the average number of days between successive prior regenerations, b) increasing the design exchange capacity when the average number of days between regenerations falls below a predetermined minimum number of days, and c) decreasing the design exchange capacity when the average number of days between regenerations exceeds a predetermined maximum number of days.

14. The method of claim 12, wherein, by executing the routine in the computer, said threshold capacity defining the lower limit for a first capacity range is set at naught percent, and said allocated capacity defining the upper limit of said first capacity range is set at fifty percent of said selected design exchange capacity.

15. The method of claim 14, wherein, by executing the routine in the computer, said threshold capacity is represented by the formula $N/(N+2)$, said allocated capacity is represented by the formula $(N+1)/(N+2)$, and N represents the number of the step in the progression as N increases from 0 to 9.

16. The method of claim 15, wherein, by executing the routine in the computer, as the threshold value of the presently selected capacity range is exceeded, the next capacity range is selected, against which the remaining available exchange capacity of the resin bed, as a percentage of the selected design exchange capacity, is compared.

17. The method of claim 12, wherein, by executing the routine in the computer, as the threshold value of the presently selected capacity range is exceeded, the next capacity range is selected, against which the remaining available exchange capacity of the resin bed, as a percentage of the selected design exchange capacity, is compared.

18. The method of claim 12, wherein by executing the routine in the computer, said threshold capacity and said allocated capacity defining each successive capacity range in said progression of capacity ranges being a greater percentage of the selected design exchange capacity than said threshold capacity and said allocated capacity defining the prior capacity range, with said threshold capacity increasing by a larger percentage of said selected design capacity than said allocated capacity for each successive capacity range, such that each successive capacity range becomes narrower.

19. The method of claim 12, the routine further capable of performing the acts of:

d) determining, by executing the routine in the computer, the quantity of saturated brine to be used for each regeneration cycle, i) establishing the approximate exchange capacity of the resin bed resulting from regenerating the resin bed from a predetermined state of exhaustion for each of a progression of different quantities of saturated brine, ii) determining the approximate remaining available exchange capacity of the resin bed immediately prior to regeneration, iii) determining a first quantity of saturated brine required to regenerated the resin bed to the selected design exchange capacity from the predetermined state of exhaustion, iv) determining a second quantity of saturated brine required to regenerate the resin bed to the approximate remaining available exchange capacity of the resin bed, from the predetermined state of exhaustion, v) determining a preferred quantity of saturated brine required to regenerate the resin bed to the design exchange capacity, by subtracting the second quantity of saturated brine from the first quantity of saturated brine, and vi) passing said preferred quantity of saturated brine through said resin bed to regenerate the resin bed to the selected design exchange capacity.

20. The method of claim 19, wherein, by executing the routine in the computer, said design exchange capacity is selected by, a) determining the average number of days between successive prior regenerations, b) increasing the design exchange capacity when the average number of days between regenerations falls below a predetermined minimum number of days, and c) decreasing the design exchange capacity when the average number of days between regenerations exceeds a predetermined maximum number of days.

21. The method of claim 19, wherein, by executing the routine in the computer, said threshold capacity defining the lower limit for a first capacity range is set at naught percent, and said allocated capacity defining the upper limit of said first capacity range is set at fifty percent of said selected design exchange capacity.

22. The method of claim 21, wherein, by executing the routine in the computer, said threshold capacity is represented by the formula $N/(N+2)$, said allocated capacity is represented by the formula $(N+1)/(N+2)$, and N represents the number of the step in the progression as N increases from 0 to 9.

23. The method of claim 22, wherein, by executing the routine in the computer, as the threshold value of the presently selected capacity range is exceeded, the next capacity range is selected, against which the remaining available exchange capacity of the resin bed, as a percentage of the selected design exchange capacity, is compared.

24. The method of claim 19, wherein, by executing the routine in the computer, as the threshold value of the presently selected capacity range is exceeded, the next capacity range is selected, against which the remaining available exchange capacity of the resin bed, as a percentage of the selected design exchange capacity, is compared.

25. The method of claim 19, wherein, by executing the routine in the computer, said threshold capacity and said allocated capacity defining each successive capacity range in said progression of capacity ranges being a greater percentage of the selected design exchange capacity than said threshold capacity and said allocated capacity defining the prior capacity range, with said threshold capacity increasing by a larger percentage of said selected design capacity than said allocated capacity for each successive capacity range, such that each successive capacity range becomes narrower.

26. A method implemented by a computer that has been programmed with a routine that causes the computer to function as a regeneration scheduling apparatus that schedules regeneration of a resin bed of a water softener based upon the remaining available exchange capacity of the resin bed, wherein the water softener has a default exchange capacity, the routine capable of performing the acts of:

a) selecting, by executing the routine in the computer, a design exchange capacity to which the resin bed is to be regenerated at the next regeneration where a default design exchange capacity is the lowest capacity of a previously defined range of design exchange capacities, i) determining the average number of days between successive prior regenerations, ii) increasing the design exchange capacity when the average number of days between regenerations falls below a predetermined minimum number of days, iii) decreasing the design exchange capacity when the average number of days between regenerations exceeds a predetermined maximum number of days, b) determining, by executing the routine in the computer, when a regeneration of the resin bed should be scheduled based upon the amount of the selected design exchange capacity which has been used since the most recent regeneration, and c) regenerating, by executing the routine in the computer, the resin bed to the selected design exchange capacity.

27. The method of claim 26, wherein, by executing the routine in the computer, the quantity of saturated brine to be used for each regeneration cycle is determined by, a) establishing the approximate exchange capacity of the resin bed resulting from regenerating the resin bed from a predetermined state of exhaustion for each of a progression of different quantities of saturated brine, b) determining the approximate remaining available exchange capacity of the resin bed immediately prior to regeneration, c) determining a first quantity of saturated brine required to regenerated the resin bed to the selected design exchange capacity from the predetermined state of exhaustion, d) determining a second quantity of saturated brine required to regenerate the resin bed to the approximate remaining available exchange capacity of the resin bed, from the predetermined state of exhaustion, e) determining a preferred quantity of saturated brine required to regenerate the resin bed to the design exchange capacity, by subtracting the second quantity of saturated brine from the first quantity of saturated brine, and f) passing said preferred quantity of saturated brine through said resin bed to regenerate the resin bed to the selected design exchange capacity.

* * * * *